United States Patent
Chen

(10) Patent No.: US 11,930,297 B2
(45) Date of Patent: Mar. 12, 2024

(54) VIDEO CALL METHOD AND TERMINAL DEVICE

(71) Applicant: VIVO MOBILE COMMUNICATION CO., LTD., Guangdong (CN)

(72) Inventor: Kai Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 285 days.

(21) Appl. No.: 17/485,957

(22) Filed: Sep. 27, 2021

(65) Prior Publication Data

US 2022/0014710 A1    Jan. 13, 2022

Related U.S. Application Data

(63) Continuation of application No. PCT/CN2020/080915, filed on Mar. 24, 2020.

(30) Foreign Application Priority Data

Mar. 29, 2019    (CN) .......................... 201910252069.6

(51) Int. Cl.
 H04N 7/14    (2006.01)
 G06F 3/0484   (2022.01)
 H04N 5/77    (2006.01)

(52) U.S. Cl.
 CPC .......... H04N 7/141 (2013.01); G06F 3/0484 (2013.01); H04N 5/77 (2013.01)

(58) Field of Classification Search
 CPC . H04N 7/141; H04N 7/14; H04N 5/77; G06F 3/0484
 See application file for complete search history.

(56) References Cited

U.S. PATENT DOCUMENTS

| 7,783,016 | B2* | 8/2010 | Wolfman | H04M 1/575 |
| | | | | 379/207.15 |
| 8,600,012 | B1* | 12/2013 | Zhang | H04M 3/53366 |
| | | | | 379/88.16 |
| 9,681,099 | B1* | 6/2017 | Deets, Jr. | G06Q 10/10 |
| 9,762,729 | B1* | 9/2017 | Sales | H04L 61/4594 |
| 2010/0182248 | A1 | 7/2010 | Chun | |
| 2011/0193806 | A1* | 8/2011 | Kim | G06F 1/1641 |
| | | | | 345/1.3 |

(Continued)

FOREIGN PATENT DOCUMENTS

| CN | 1988648 A | 6/2007 |
| CN | 104539815 A | 4/2015 |

(Continued)

OTHER PUBLICATIONS

International Search Report of International Application No. PCT/CN2020/080915 dated Jun. 29, 2020.

(Continued)

Primary Examiner — Olisa Anwah
(74) Attorney, Agent, or Firm — IP & T GROUP LLP

(57) ABSTRACT

A video call method includes: receiving a first input performed by a user on a first target contact that is displayed on a first screen; and in response to the first input, initiating a video call request to the first target contact, and displaying a video call interface corresponding to the first target contact on the second screen.

9 Claims, 5 Drawing Sheets

(56) References Cited

U.S. PATENT DOCUMENTS

| | | | | |
|---|---|---|---|---|
| 2013/0148646 A1* | 6/2013 | Efrati | ................ | H04M 3/42042 |
| | | | | 370/352 |
| 2014/0240440 A1* | 8/2014 | Seo | ................ | H04L 51/04 |
| | | | | 715/753 |
| 2015/0022625 A1* | 1/2015 | Thapa | ................ | H04L 65/4038 |
| | | | | 348/14.08 |
| 2015/0317120 A1* | 11/2015 | Kim | ................ | G06F 1/1686 |
| | | | | 345/1.3 |
| 2017/0357473 A1* | 12/2017 | Kim | ................ | G06F 1/1681 |
| 2019/0268567 A1* | 8/2019 | Ahn | ................ | G06F 3/04842 |

FOREIGN PATENT DOCUMENTS

| | | |
|---|---|---|
| CN | 104917909 A | 9/2015 |
| CN | 105657149 A | 6/2016 |
| CN | 105871683 A | 8/2016 |
| CN | 106998377 A | 8/2017 |
| CN | 108540596 A | 9/2018 |
| CN | 108712577 A | 10/2018 |
| CN | 108848226 A | 11/2018 |
| CN | 108881742 A | 11/2018 |
| CN | 108900695 A | 11/2018 |
| CN | 109327672 A | 2/2019 |
| CN | 109889757 A | 6/2019 |
| JP | 2005-159567 A | 6/2005 |

OTHER PUBLICATIONS

Written Opinion of The International Searching Authority of International Application No. PCT/CN2020/080915 dated Jun. 29, 2020.
First Office Action of Priority Application No. CN 201910252069.6 dated May 13, 2020.
The Second Office Action of Priority Application No. CN 201910252069.6 dated Nov. 11, 2020.
Notification to Grant Patent Right for Invention of Priority Application No. CN 201910252069.6 dated Apr. 15, 2021.
Extended European Search Report for European Patent Application No. 20782809.6 issued by the European Patent Office dated May 25, 2022.

* cited by examiner

VIDEO CALL METHOD AND TERMINAL DEVICE

CROSS REFERENCE TO RELATED APPLICATIONS

This application is a Bypass Continuation Application of PCT/CN2020/080915 filed on Mar. 24, 2020, which claims priority to Chinese Patent Application No. 201910252069.6 filed on Mar. 29, 2019, which are incorporated herein by reference in their entirety.

TECHNICAL FIELD

The present disclosure relates to the field of communications technologies, and in particular, to a video call method and a terminal device.

BACKGROUND

With development of mobile phone technologies, there is an increasing number of dual-screen mobile phones used as full-screen solutions, and human-computer interaction of the dual-screen mobile phones is becoming increasingly important.

On a single-screen mobile phone with a camera on a front side, a video chat can be directly conducted. However, on a dual-screen mobile phone with a non-camera full screen on a front side, a video chat can be conducted only by using a camera on a rear side, or a camera is disposed on each of a main screen and a rear screen of the dual-screen mobile phone, but resolution of the camera on the main screen is lower than that of the camera on the rear screen. In this case, when a user is using the main screen, and wants to conduct a video chat by using the camera on the rear screen, the user needs to switch from the main screen to the rear screen and initiate a video call on the rear screen, to conduct the video chat by using the camera corresponding to the rear screen. The operation is complex.

SUMMARY

According to a first aspect, an embodiment of the present disclosure provides a video call method, applied to a terminal device, where the terminal device includes a first screen and a second screen, the first screen is located on a first surface of the terminal device, the second screen is located on a second surface of the terminal device, a camera is disposed on the second surface, and the method includes:
  receiving a first input performed by a user on a first target contact that is displayed on the first screen; and
  initiating a video call request to the first target contact in response to the first input, and displaying a video call interface corresponding to the first target contact on the second screen.

According to a second aspect, an embodiment of the present disclosure further provides a terminal device, including a first screen and a second screen, where the first screen is located on a first surface of the terminal device, the second screen is located on a second surface of the terminal device, a camera is disposed on the second surface, and the terminal device further includes:
  a first receiving module, configured to receive a first input performed by a user on a first target contact that is displayed on the first screen; and
  a first response module, configured to initiate a video call request to the first target contact in response to the first input, and display a video call interface corresponding to the first target contact on the second screen.

According to a third aspect, an embodiment of the present disclosure further provides a terminal device, including: a processor, a memory, and a program that is stored in the memory and executable on the processor, where when the program is executed by the processor, the steps of the foregoing video call method are implemented.

According to a fourth aspect, an embodiment of the present disclosure further provides a non-transitory computer-readable storage medium, where the non-transitory computer-readable storage medium stores a program, and when the program is executed by a processor, the steps of the foregoing video call method are implemented.

DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
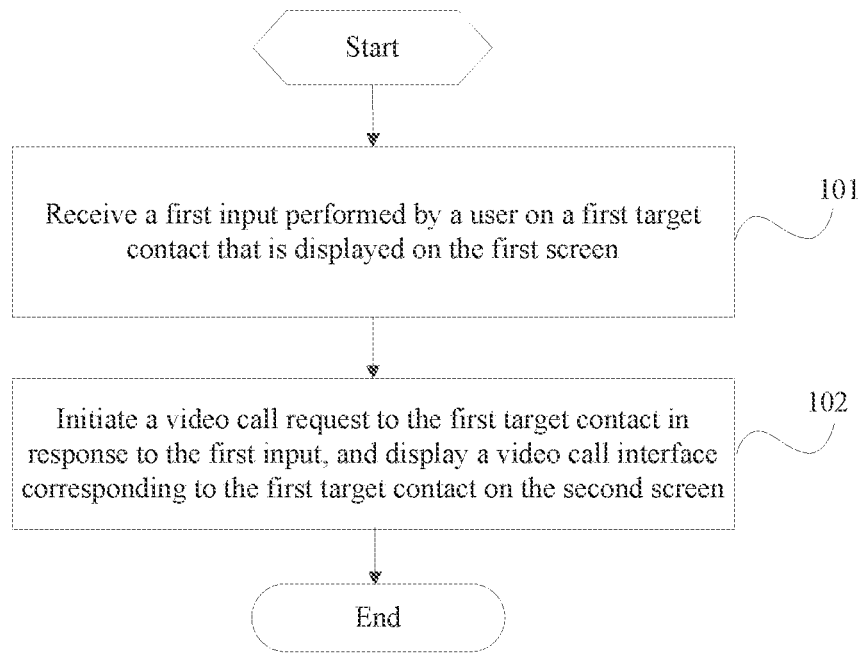
FIG. 1 is a schematic flowchart of a video call method according to an embodiment of the present disclosure.

FIG. 1 is a schematic flowchart of a video call method according to an embodiment of the present disclosure. An implementation process of the method is described below reference to FIG. 1.

It should be noted that, an embodiment of the present disclosure provides a video call method, applied to a terminal device. The terminal device includes a first screen and a second screen. The first screen is located on a first surface of the terminal device. The second screen is located on a second surface of the terminal device. A camera is disposed on the second surface. For example, the second surface includes the second screen and a terminal panel surrounding the second screen. The camera can be disposed on the second screen, or can be disposed on the terminal panel. Optionally, the first surface and the second surface are disposed oppositely. The first screen may be a main screen, that is, a screen mainly used by a user. The first screen is a full screen, and the second screen is a secondary screen. The camera can be used as a rear camera of the terminal device. The terminal device may be a dual-sided-screen terminal, or may be a foldable-screen terminal. In other words, a specific manner of connection between the first screen and the second screen is not limited herein. For example, both the first screen and the second screen may be fixed on a middle frame of the terminal device. For another example, the first screen and the second screen may be connected in a hinged manner, and the second screen can rotate to a plane where the first screen is located to constitute a large screen with the first screen. For still another example, the first screen and the second screen may be connected by using a flexible structure.

The video call method may include the following steps 101 and 102.

Step 101: Receive a first input performed by a user on a first target contact that is displayed on the first screen.

For example, a first input performed by a user on a first target contact in a contact menu that is displayed on the first screen is received. The first screen may be a full screen. No camera is disposed on the full screen. The contact menu includes at least one contact. The contact menu may be an address book, or may be, for example, a contact menu in a third-party chat application. The first input may be a slide input, a tap input, a touch and hold input, or the like.

Figure 2:
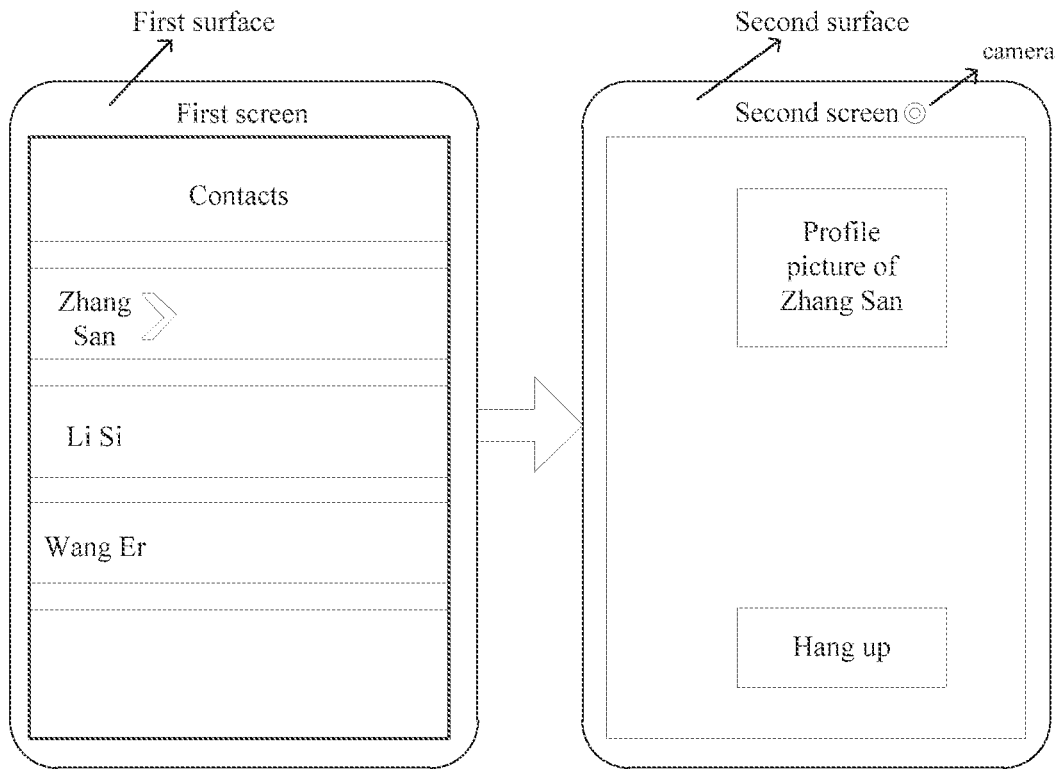
FIG. 2 is a schematic diagram of a first display interface for a video call according to an embodiment of the present disclosure.

For example, as shown in FIG. 2, the user first opens the contact menu on the first screen, finds a contact, for example, Zhang San in the contact menu, to which the user wants to initiate a video call, touches and holds the contact, and then slides rightwards.

Step 102: Initiate a video call request to the first target contact in response to the first input, and display a video call interface corresponding to the first target contact on the second screen.

After the first input is received, a system initiates a video call to the first target contact in response to the first input, and displays a video call interface corresponding to the first target contact on the second screen. As shown in FIG. 2, the video call interface may include profile picture information of the first target contact. Optionally, the video call interface may further include a hang-up button.

According to the video call method in this embodiment of the present disclosure, a video call request to a first target contact displayed on a first screen can be initiated via a first input performed on the first target contact, and a video call interface corresponding to the first target contact can be displayed on a second screen. In other words, the video call interface can be displayed on the second screen without requiring the user to switch from the first screen to the second screen and initiate a video call on the second screen. Therefore, the operation is simple and fast.

Optionally, the step of initiating a video call request to the first target contact in response to the first input, and displaying a video call interface corresponding to the first target contact on the second screen may include:

displaying a prompt interface on the first screen in response to the first input, where the prompt interface includes a video call initiation option;

receiving a second input performed by the user on the video call initiation option on the prompt interface; and initiating a video call request to the first target contact in response to the second input, and displaying a video call interface corresponding to the first target contact on the second screen.

Figure 3:
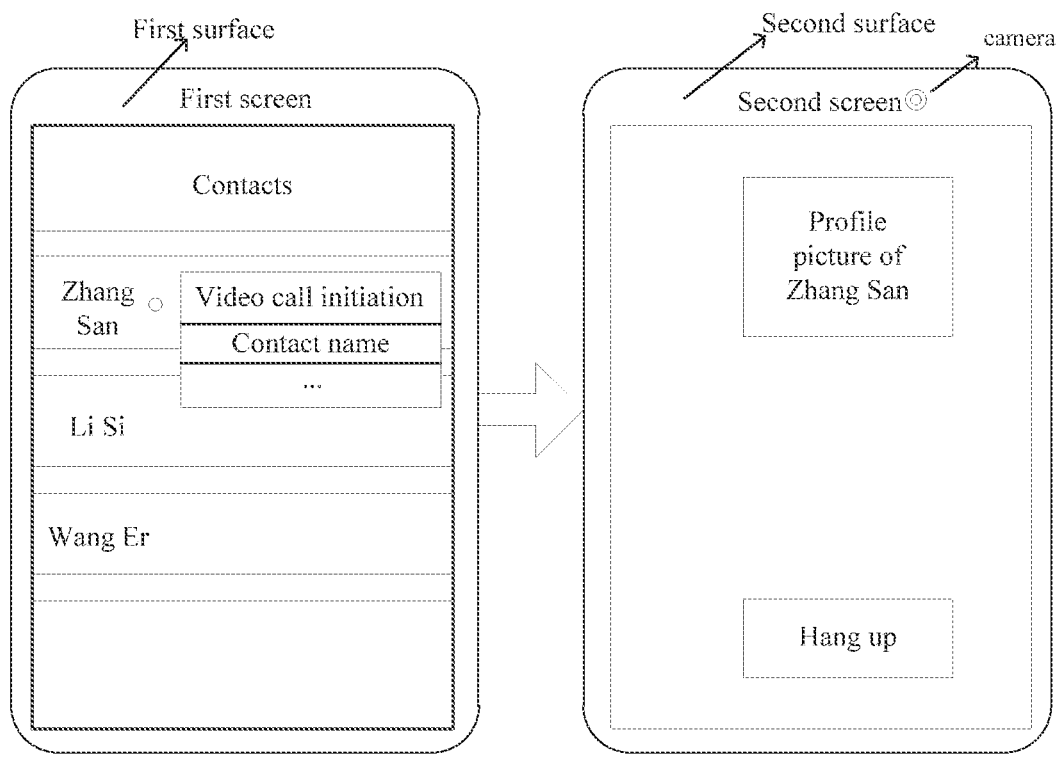
FIG. 3 is a schematic diagram of a second display interface for a video call according to an embodiment of the present disclosure.

The first input may be a touch and hold input. After the user touches and holds a display area corresponding to a second target contact on the first screen, as shown in FIG. 3, a prompt interface is displayed on the first screen. The prompt interface includes a video call initiation option. Optionally, the prompt interface may further include another option. Content of the another option is not specifically limited herein.

The second input may be a tap input. After a tap input of the user on the video call initiation option is received, a video call interface corresponding to the first target contact is displayed on the second screen.

Herein, a prompt interface is displayed on the first screen in response to the first input, so that the user can enable a video call interface corresponding to the first target contact to be conveniently and quickly displayed on the second screen via the prompt interface displayed on the first screen, and there is no need for the user to switch to the second screen and initiate a video call request on the second screen.

Optionally, according to the video call method in this embodiment of the present disclosure, after the displaying a video call interface corresponding to the first target contact on the second screen, the method may further include:

controlling the camera to collect a video image when the first target contact accepts the video call request, and displaying, on the video call interface, the video image collected by the camera and video information corresponding to the first target contact.

Herein, after the video call interface corresponding to the first target contact is displayed on the second screen, the user can conduct a video call to the first target contact via the video call interface. After the first target contact accepts the video call request, the camera is controlled to collect a local video image, and the local video image collected by the camera is sent to the first target contact and displayed on the video call interface. Video information corresponding to the first target contact may be collected by a camera on a terminal used by the first target contact.

When the first target contact accepts the video call request, the local video image and the video information that corresponds to the first target contact can be displayed on the video call interface, implementing a video call to the first target contact.

Optionally, after the displaying a video call interface corresponding to the first target contact on the second screen, the method may further include:

recording a video image by using the camera when the first target contact does not accept the video call request, and sending the recorded video image to the first target contact after the first target contact accepts the video call request.

Herein, the video image is recorded within a period from a moment when a video call request is initiated to the first target contact to a moment when the first target contact accepts the video call request, so that a period for the user to wait for the other party to accept the video call is fully utilized, thereby reducing time for the user to record the video image. In addition, after the first target contact accepts the video call request, the video image recorded in advance is sent to the first target contact, and the video call can be directly hung up after the video image is played on a display interface of a terminal corresponding to the first target contact, or after the video image is played on the display interface of the terminal corresponding to the first target contact, a preset button on the display interface is tapped, and a real-time video call can be conducted.

In addition, in this embodiment of the present disclosure, after the displaying a video call interface corresponding to the first target contact on the second screen, the method may further include:

simultaneously conducting a video call and recording a video when the first target contact accepts the video call request.

Optionally, after the displaying a video call interface corresponding to the first target contact on the second screen, the method may further include:

receiving a third input performed by the user on a second target contact that is displayed on the first screen; and adding target information corresponding to the second target contact on the video call interface in response to the third input.

For example, a third input performed by the user on a second target contact in a contact menu that is displayed on the first screen is received, and the target information may be profile picture information of the second target contact. Certainly, in this embodiment of the present disclosure, the target information may further include other information, for example, a name, of the second target contact. This is not specifically limited herein.

The third input may be a slide input, a tap input, a touch and hold input, or the like on the second target contact. The third input may further include a first sub-input and a second sub-input. The first sub-input may be a tap input performed on the second target contact. After the first sub-input is received, the prompt interface is displayed. The second sub-input may be an input performed on a video call initiation option on the prompt interface, and the second sub-input may be a tap input.

Figure 4:
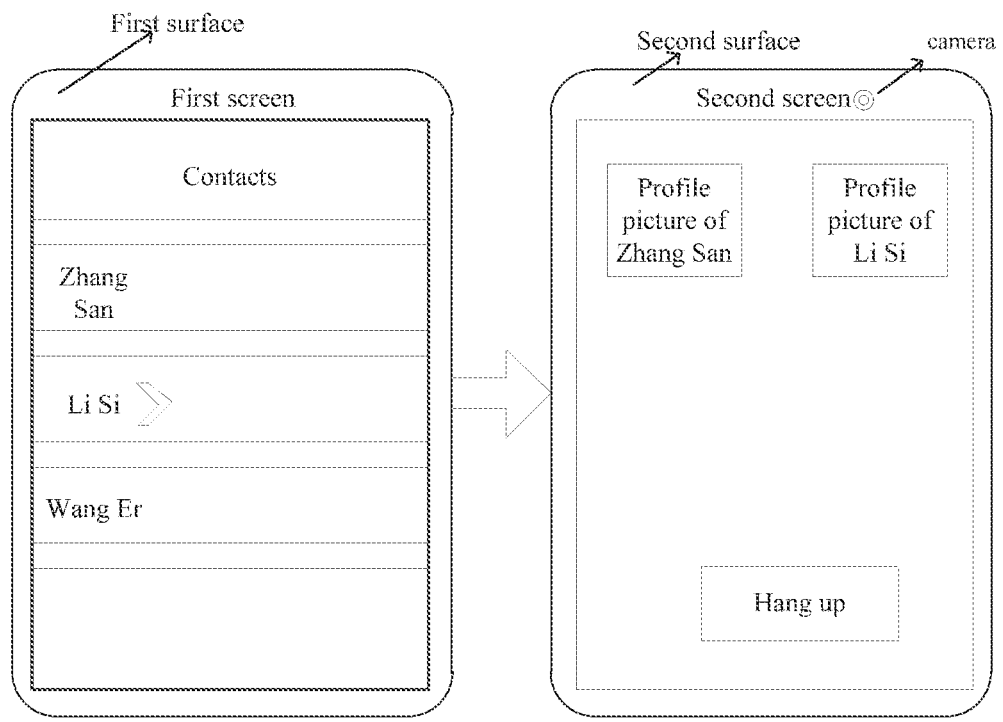
FIG. 4 is a schematic diagram of a third display interface for a video call according to an embodiment of the present disclosure.
Figure 5:
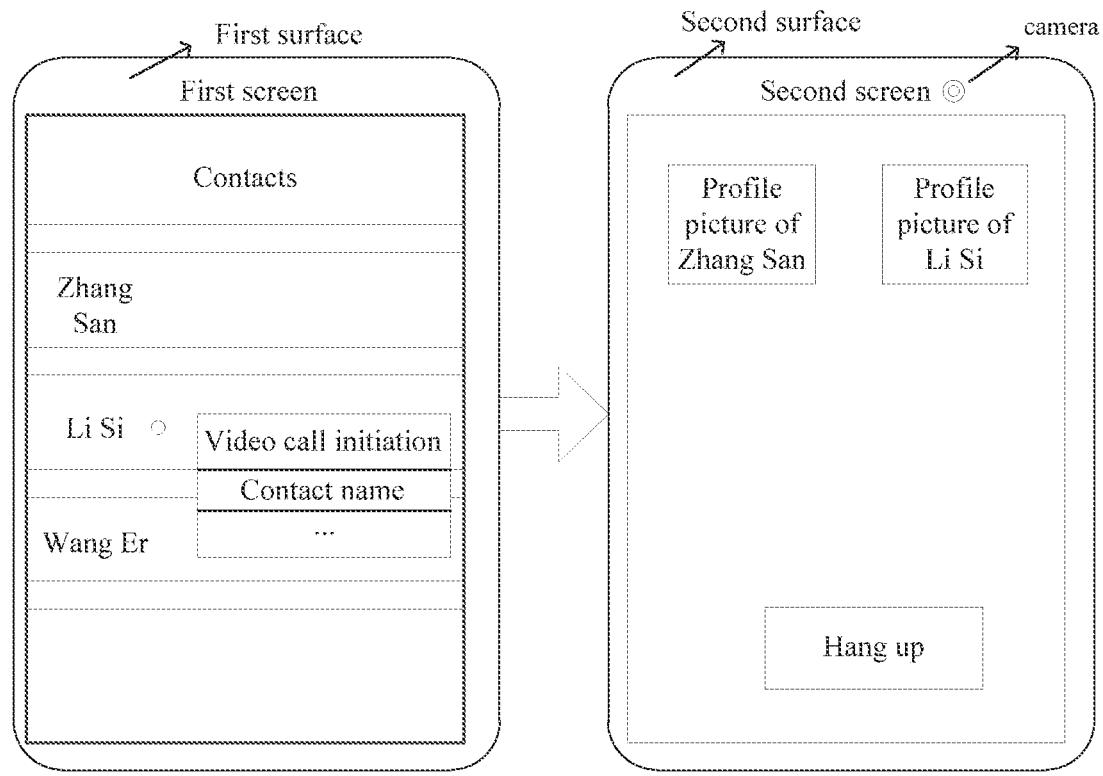
FIG. 5 is a schematic diagram of a fourth display interface for a video call according to an embodiment of the present disclosure.

In this embodiment, by selecting a corresponding target contact in a contact menu displayed on the first screen, the user can add, on the video call interface, target information corresponding to the target contact, that is, a video call to the target contact is set up on the second screen. Therefore, the operation is simple and fast. For example, if the third input is received before the first target contact accepts the video call request, profile picture information of the second target contact is added, in response to the third input, on a video call interface on which profile picture information of the first target contact is displayed, as shown in FIG. 4 or FIG. 5; or if the third input is received after the first target contact accepts the video call request, profile picture information of the second target contact is added, in response to the third input, on a video call interface on which video information of the first target contact is displayed.

Herein, the profile picture information of the second target contact is added, in response to the third input, on the video call interface on which the profile picture information of the first target contact is displayed, so that the user can conveniently identify which contact the user has set up a video call to.

After the second target contact accepts the video call request, profile picture information of the second target contact is updated to video information corresponding to the second target contact.

In this embodiment of this application, video information corresponding to the first target contact may be video information collected by a camera on a terminal used by the first target contact. Video information corresponding to the second target contact may be video information collected by a camera on a terminal used by the second target contact.

In this embodiment of the present disclosure, if the user wants to set up a video call to at least two targets, the user can select corresponding target contacts in a contact menu displayed on the first screen, so that the video call to the corresponding target contacts can be set up on the second screen. Therefore, the operation is simple and fast.

Optionally, after the displaying a video call interface corresponding to the first target contact on the second screen, the method may further include:

receiving a fourth input performed by the user on a hang-up button on the video call interface: and hanging up a video call to the first target contact in response to the fourth input.

In this embodiment of the present disclosure, a hang-up button is displayed on a target interface. The hang-up button is used to end a video call.

The fourth input may be a tap input, a touch and hold input, or the like. For example, after it is detected that the user taps the hang-up button, a video call to the first target contact can be ended, or a video call to the first target contact or the second target contact can be ended.

According to the video call method in this embodiment of the present disclosure, a video call request to a first target contact displayed on a first screen can be initiated via a first input performed on the first target contact, and a video call interface corresponding to the first target contact can be displayed on a second screen. In other words, the video call interface can be displayed on the second screen without requiring the user to switch from the first screen to the second screen and initiate a video call on the second screen. Therefore, the operation is simple and fast.

Figure 6:
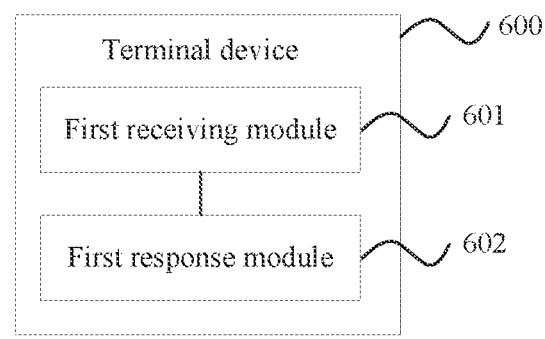
FIG. 6 is a first schematic module diagram of a terminal device according to an embodiment of the present disclosure.

As shown in FIG. 6, an embodiment of the present disclosure further provides a terminal device 600, including a first screen and a second screen. The first screen is located on a first surface of the terminal device. The second screen is located on a second surface of the terminal device. A camera is disposed on the second surface. The terminal device further includes:

a first receiving module 601, configured to receive a first input performed by a user on a first target contact that is displayed on the first screen; and a first response module 602, configured to initiate a video call request to the first target contact in response to the first input, and display a video call interface corresponding to the first target contact on the second screen.

Figure 7:
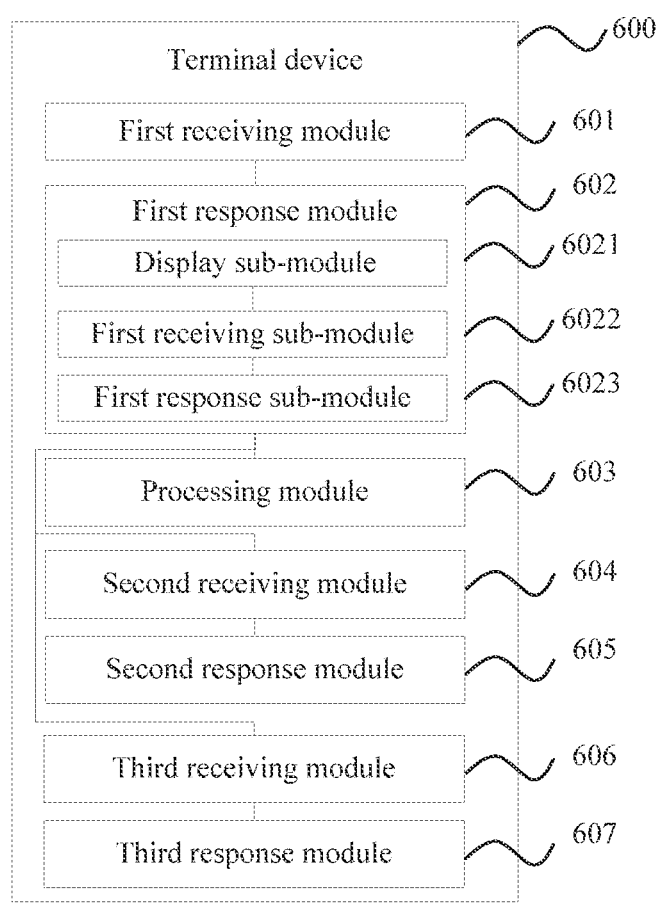
FIG. 7 is a second schematic module diagram of a terminal device according to an embodiment of the present disclosure.

Optionally, in the terminal device in this embodiment of the present disclosure, as shown in FIG. 7, the first response module 602 includes:

a display sub-module 6021, configured to display a prompt interface on the first screen in response to the first input, where the prompt interface includes a video call initiation option;

a first receiving sub-module 6022, configured to receive a second input performed by the user on the video call initiation option on the prompt interface; and a first response sub-module 6023, configured to initiate a video call request to the first target contact in response to the second input, and display a video call interface corresponding to the first target contact on the second screen.

Optionally, the terminal device in this embodiment of the present disclosure further includes:

a processing module 603, configured to record a video image by using the camera when the first target contact does not accept the video call request, and send the recorded video image to the first target contact after the first target contact accepts the video call request.

Optionally, the terminal device in this embodiment of the present disclosure further includes:

a second receiving module 604, configured to after the first response module displays the video call interface corresponding to the first target contact on the second screen, receive a third input performed by the user on a second target contact that is displayed on the first screen; and a second response module 605, configured to add target information corresponding to the second target contact on the video call interface in response to the third input.

Optionally, in the terminal device in this embodiment of the present disclosure, the target information includes profile picture information corresponding to the second target contact.

Optionally, the terminal device in this embodiment of the present disclosure further includes:

a third receiving module 606, configured to after the first response module displays a target interface for the video call request on the second screen, receive a fourth input performed by the user on a hang-up button on the target interface; and a third response module 607, configured to hang up a video call to the first target contact in response to the fourth input.

According to the terminal device in this embodiment of the present disclosure, a video call request to a first target contact displayed on a first screen can be initiated via a first input performed on the first target contact, and a video call interface corresponding to the first target contact can be displayed on a second screen. In other words, the video call interface can be displayed on the second screen without requiring the user to switch from the first screen to the second screen and initiate a video call on the second screen. Therefore, the operation is simple and fast.

It should be noted that, the terminal device is a terminal device corresponding to the foregoing method embodiment. All implementations in the foregoing method embodiment are applicable to the embodiment of the terminal device, and a same technical effect can be achieved.

Figure 8:
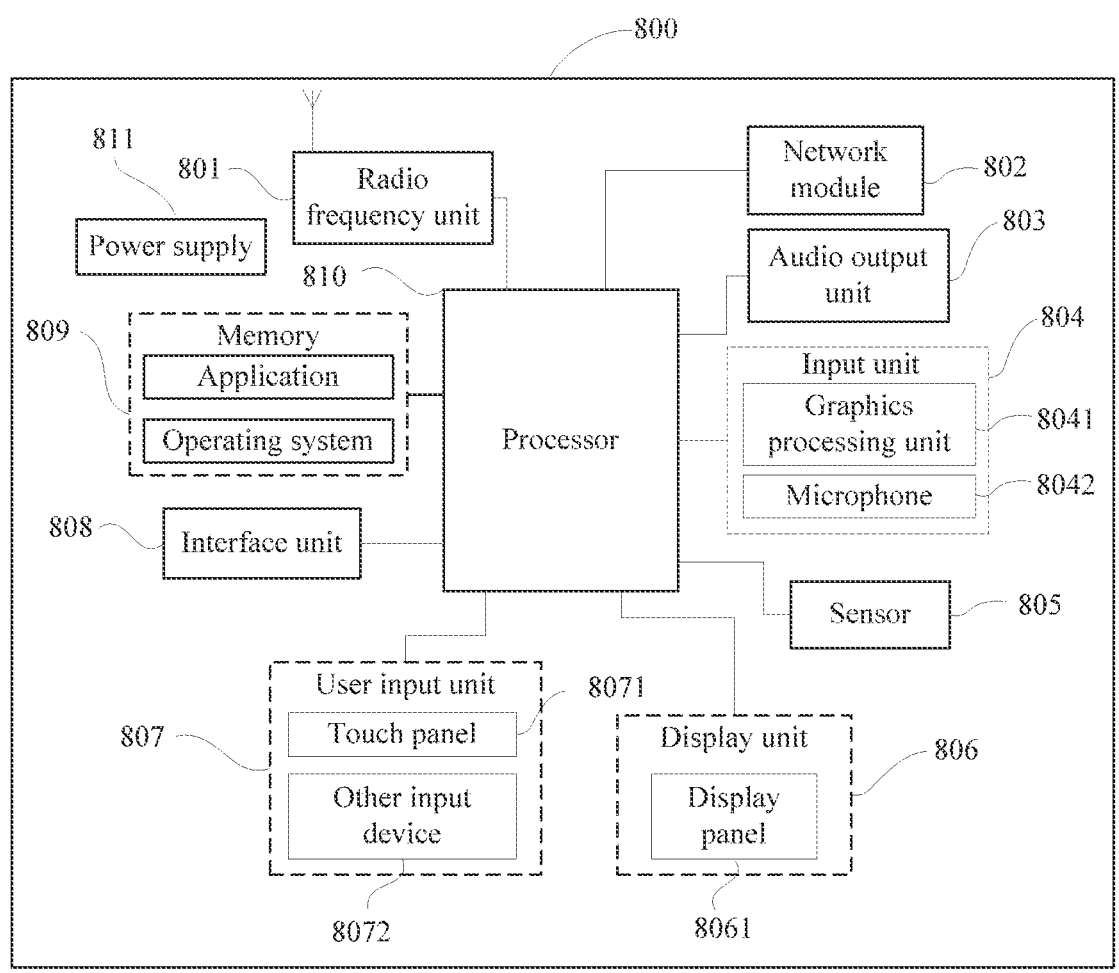
FIG. 8 is a structural block diagram of a terminal device according to an embodiment of the present disclosure.

FIG. 8 is a schematic diagram of a hardware structure of a terminal device implementing the various embodiments of the present disclosure. The terminal device 800 includes, but not limited to: a radio frequency unit 801, a network module 802, an audio output unit 803, an input unit 804, a sensor 805, a display unit 806, a user input unit 807, an interface unit 808, a memory 809, a processor 810, a power supply 811, and the like. A person skilled in the art may understand that the structure of the terminal device shown in FIG. 8 does not constitute a limitation to the terminal. The terminal device may include more or fewer components than those shown in the figure, or some components may be combined, or there may be a different component arrangement. In this embodiment of the present disclosure, the terminal device includes but is not limited to a mobile phone, a tablet computer, a notebook computer, a palmtop computer, a vehicle-mounted terminal, a wearable device, a pedometer, or the like.

The user input unit 807 is configured to receive a first input performed by a user on a first target contact that is displayed on the first screen.

The processor 810 is configured to initiate a video call request to the first target contact in response to the first input, and display a video call interface corresponding to the first target contact on the second screen via the display unit 806.

In the foregoing technical solutions of this embodiment of the present disclosure, a video call request to a first target contact displayed on a first screen can be initiated via a first input performed on the first target contact, and a video call interface corresponding to the first target contact can be displayed on a second screen. In other words, the video call interface can be displayed on the second screen without requiring the user to switch from the first screen to the second screen and initiate a video call on the second screen. Therefore, the operation is simple and fast.

It should be understood that in this embodiment of the present disclosure, the radio frequency unit 801 may be configured to receive and transmit information, or receive and transmit signals during a call. For example, the radio frequency unit 801 receives downlink data from a base station, and transmits the downlink data to the processor 810 for processing; and in addition, transmits uplink data to the base station. Usually, the radio frequency unit 801 includes, but not limited to, an antenna, at least one amplifier, a transceiver, a coupler, a low noise amplifier, and a duplexer. In addition, the radio frequency unit 801 may also communicate with a network and another device through a radio communications system.

The terminal device provides a user with wireless broadband Internet access through the network module 802, for example, helps the user send and receive emails, browse web pages, and access streaming media.

The audio output unit 803 can convert audio data received by the radio frequency unit 801 or the network module 802 or stored in the memory 809 into an audio signal, and output the audio signal as sound. In addition, the audio output unit 803 may further provide audio output (for example, call signal receiving sound or message receiving sound) related to a specific function performed by the terminal device 800. The audio output unit 803 includes a loudspeaker, a buzzer, a receiver, and the like.

The input unit 804 is configured to receive audio or video signals. The input unit 804 may include a graphics processing unit (GPU) 8041 and a microphone 8042. The graphics processing unit 8041 is configured to process image data of a static picture or a video obtained by an image capture apparatus (for example, a camera) in a video capture mode or an image capture mode. A processed image frame may be displayed on the display unit 806. The image frame processed by the graphics processing unit 8041 can be stored in the memory 809 (or another storage medium) or sent via the radio frequency unit 801 or the network module 802. The microphone 8042 may receive a sound and can process such sound into audio data. Processed audio data may be converted, in telephone call mode, into a format that may be sent to a mobile communication base station via the radio frequency unit 801 for output.

The terminal device 800 further includes at least one sensor 805, such as a light sensor, a motion sensor, and other sensors. For example, the optical sensor includes an ambient light sensor and a proximity sensor. The ambient light sensor may adjust luminance of the display panel 8061 based on brightness of ambient light. The proximity sensor may turn off the display panel 8061 and/or backlight when the terminal device 800 approaches an ear. As a type of motion sensor, an accelerometer sensor may detect values of accelerations in various directions (generally three axes), and may detect a value and a direction of gravity when the terminal stays still. The accelerometer sensor may be configured to recognize a terminal posture (for example, landscape/portrait screen switching, a related game, or magnetometer posture calibration), performs a vibration recognition related function (for example, a pedometer or a strike), and so on. The sensor 805 may further include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information entered by a user or information provided for a user. The display unit 806 may include a display panel 8061, and may configure the display panel 8061 in the forms of a liquid crystal display (LCD), an organic light-emitting diode (OLED) and the like.

The user input unit 807 may be configured to receive input numeric or character information, and generate key signal inputs related to user settings and function control of the terminal device. For example, the user input unit 807 includes a touch panel 8071 and another input device 8072. The touch panel 8071 is also referred to as a touchscreen, and may collect a touch operation performed by a user on or near the touch panel 8071 (such as an operation performed by a user on the touch panel 8071 or near the touch panel 8071 by using any proper object or accessory, such as a finger or a stylus). The touch panel 8071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 810, and can receive and execute a command sent by the processor 810. In addition, the touch panel 8071 may be of a resistive type, a capacitive type, an infrared type, a surface acoustic wave type, or the like. The user input unit 807 may further include other input devices 8072 in addition to the touch panel 8071. For example, the other input devices 8072 may include but are not limited to a physical keyboard, a function key (such as a volume control key or a power on/off key), a trackball, a mouse, a joystick, and the like. Details are not described herein.

Optionally, the touch panel 8071 may cover the display panel 8061. When detecting a touch operation on or near the touch panel 8071, the touch panel 8071 transmits the touch operation to the processor 810 to determine a type of a touch event. Then the processor 810 provides corresponding visual output on the display panel 8061 based on the type of the touch event. Although in FIG. 8, the touch panel 8071 and the display panel 8061 are configured as two independent components to implement input and output functions of the terminal device, in some embodiments, the touch panel 8071 and the display panel 8061 can be integrated to implement the input and output functions of the terminal device. Details are not limited herein.

The interface unit 808 is an interface for connecting an external apparatus to the terminal device 800. For example, the external apparatus may include a wired or wireless headset jack, an external power supply (or a battery charger) port, a wired or wireless data port, a storage card port, a port for connecting an apparatus having an identification module, an audio input/output WO) port, a video I/O port, a headset jack, or the like. The interface unit 808 may be configured to receive an input (for example, data information and power) from the external apparatus and transmit the received input to one or more elements in the terminal device 800, or transmit data between the terminal device 800 and the external apparatus.

The memory 809 may be configured to store a software program as well as various types of data. The memory 809 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 809 may include a high speed random access memory, and may further include a non-volatile memory, for example, at least one magnetic disk memory device, a flash memory device, or other volatile solid state memory devices.

The processor 810 is a control center of the terminal device. The processor 810 uses various interfaces and lines to connect all parts of the entire terminal device, and performs various functions and data processing of the terminal device by running or executing the software program and/or module stored in the memory 809 and invoking data stored in the memory 809, thereby performing overall monitoring on the terminal device. The processor 810 may include one or more processing units. Optionally, the processor 810 may be integrated with an application processor and a modem processor. The application processor mainly processes an operating system, a user interface, an application program, and the like, and the modem processor mainly processes wireless communication, it can be understood that alternatively, the modem processor may not be integrated into the processor 810.

The terminal device 800 may further include the power supply 811 (such as a battery) that supplies power to each component. Optionally, the power supply 811 may be logically connected to the processor 810 by using a power management system, to implement functions such as charging, discharging, and power consumption management by using the power management system.

In addition, the terminal device 800 includes some functional modules that are not shown. Details are not described herein.

Optionally, an embodiment of the present disclosure further provides a terminal device, including a processor, a memory, and a program that is stored in the memory and executable on the processor. When the program is executed by the processor, each process of the foregoing video call method embodiment can be implemented, and a same technical effect can be achieved. To avoid repetition, details are not described herein.

The embodiments of the present disclosure further provide a non-transitory computer-readable storage medium. The non-transitory computer-readable storage medium stores a program, and when the program is executed by a processor, the processes of the foregoing video call method embodiment are implemented and the same technical effect can be achieved. To avoid repetition, details are not described herein again. The non-transitory computer-readable storage medium is, for example, a read-only memory (ROM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing methods in the embodiments may be implemented by using software plus a required universal hardware platform, or certainly may be implemented by using hardware. However, in many cases, the former is a better implementation. Based on such an understanding, the technical solutions of the present disclosure essentially or the part contributing to the related art may be implemented in a form of a software product. The computer software product is stored in a storage medium (such as a ROM/RAM, a hard disk, or a compact disc), and includes several instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A video call method, applied to a terminal device, wherein the terminal device comprises a first screen and a second screen, the first screen is located on a first surface of the terminal device, the second screen is located on a second surface of the terminal device, a camera is disposed on the second surface, and the method comprises:
   receiving a first input performed by a user on a first target contact that is displayed on the first screen;
   initiating a video call request to the first target contact in response to the first input, and displaying a video call interface corresponding to the first target contact on the second screen; and
   recording a video image by using the camera within a period from a moment when the video call request is initiated to the first target contact to a moment when the first target contact accepts the video call request, and sending the recorded video image to the first target contact after the first target contact accepts the video call request.

2. The video call method according to claim 1, wherein after the displaying a video call interface corresponding to the first target contact on the second screen, the method further comprises:
   receiving a third input performed by the user on a second target contact that is displayed on the first screen; and
   adding target information corresponding to the second target contact on the video call interface in response to the third input.

3. The video call method according to claim 2, wherein the target information comprises profile picture information corresponding to the second target contact.

4. A terminal device, comprising a first screen and a second screen, wherein the first screen is located on a first surface of the terminal device, the second screen is located on a second surface of the terminal device, a camera is disposed on the second surface; the terminal device further comprises a processor, a memory, and a program that is stored in the memory and executable on the processor, and the program, when executed by the processor, causes the terminal device to perform:
   receiving a first input performed by a user on a first target contact that is displayed on the first screen;
   initiating a video call request to the first target contact in response to the first input, and displaying a video call interface corresponding to the first target contact on the second screen; and
   recording a video image by using the camera within a period from a moment when the video call request is initiated to the first target contact to a moment when the first target contact accepts the video call request, and sending the recorded video image to the first target contact after the first target contact accepts the video call request.

5. The terminal device according to claim 4, wherein the program, when executed by the processor, causes the terminal device to further perform:
   receiving a third input performed by the user on a second target contact that is displayed on the first screen; and
   adding target information corresponding to the second target contact on the video call interface in response to the third input.

6. The terminal device according to claim 5, wherein the target information comprises profile picture information corresponding to the second target contact.

7. A non-transitory computer-readable storage medium, wherein the non-transitory computer-readable storage medium stores a program, and the program, when executed by a processor of a terminal device, causes the terminal device to perform:
   receiving a first input performed by a user on a first target contact that is displayed on the first screen;
   initiating a video call request to the first target contact in response to the first input, and displaying a video call interface corresponding to the first target contact on the second screen; and
   recording a video image by using the camera within a period from a moment when the video call request is initiated to the first target contact to a moment when the first target contact accepts the video call request, and sending the recorded video image to the first target contact after the first target contact accepts the video call request;
   wherein the terminal device comprises a first screen and a second screen, the first screen is located on a first surface of the terminal device, the second screen is located on a second surface of the terminal device, a camera is disposed on the second surface.

8. The non-transitory computer-readable storage medium according to claim 7, wherein the program, when executed by the processor, causes the terminal device to further perform:
   receiving a third input performed by the user on a second target contact that is displayed on the first screen; and
   adding target information corresponding to the second target contact on the video call interface in response to the third input.

9. The non-transitory computer-readable storage medium according to claim 8, wherein the target information comprises profile picture information corresponding to the second target contact.

* * * * *